US008317361B2

(12) United States Patent
Lee

(10) Patent No.: US 8,317,361 B2
(45) Date of Patent: Nov. 27, 2012

(54) OPERATION LAMP AND ILLUMINATION UNIT THEREOF

(76) Inventor: Chien-Kun Lee, Taipei (TW)

( * ) Notice: Subject to any disclaimer, the term of this patent is extended or adjusted under 35 U.S.C. 154(b) by 365 days.

(21) Appl. No.: 12/850,446

(22) Filed: Aug. 4, 2010

(65) Prior Publication Data

US 2011/0317411 A1 Dec. 29, 2011

(30) Foreign Application Priority Data

Jun. 23, 2010 (TW) ................................ 99120381 A

(51) Int. Cl.
*F21V 5/04* (2006.01)
*B23P 17/04* (2006.01)
*F21V 31/00* (2006.01)
*F21V 7/00* (2006.01)

(52) U.S. Cl. ................... 362/235; 362/249.02; 362/244; 362/218

(58) Field of Classification Search .................. 362/235, 362/249.02, 244, 218, 401.1
See application file for complete search history.

(56) References Cited

U.S. PATENT DOCUMENTS

2010/0302758 A1* 12/2010 Wang .............................. 362/20
2011/0182067 A1* 7/2011 Watanabe ...................... 362/235
2012/0155080 A1* 6/2012 Schupple et al. ............. 362/235

* cited by examiner

*Primary Examiner* — Joseph L Williams
(74) *Attorney, Agent, or Firm* — Guice Patents PLLC

(57) ABSTRACT

The present invention relates to an operation lamp, consists of a plurality of illumination units, a fastening seat, a focus adjusting device and a lamp housing. The illumination units are designed to be modularized, so a plurality of LED light source sets and reflection mirrors can be processed with a rapid focus adjustment for allowing each illumination unit reflecting and concentrating and focusing light for forming a concentrated light beam. Moreover, after the plural illumination units and the lamp housing are assembled, through adjusting the height difference between at least two pivot parts at the outer end of each illumination unit and supporting members, the left/right oblique angle of the illumination unit is able to be adjusted, such that each concentrated light beam can be precisely adjusted to pass through the lamp center. Moreover, by adjusting the focus adjusting device, the elevation angle of the inner end of each illumination unit is adjusted, such that the concentrated light beam is able to be freely adjusted to any projection location in the horizontal direction, so as to adjust the illumination area.

16 Claims, 9 Drawing Sheets

A-A

OPERATION LAMP AND ILLUMINATION UNIT THEREOF

BACKGROUND OF THE INVENTION

1. Field of the Invention

The present invention relates to an operation lamp, especially to an operation lamp having functions of rapidly reflecting and focusing a plurality of LED light source sets. The present invention further provides an illumination unit for operation lamp.

2. Description of Related Art

For performing surgeries, an operation lamp is a must-have device for providing illumination. Conventional operation lamp structures can be categorized to a single-light-source single-reflection-mirror structure and a multi-light source structure. The single-light-source single-reflection-mirror structure adopts a high power, e.g. 150 W, light source, for example a halogen lamp or a high intensity discharge (HID) lamp being served as the required light source and reflected and concentrated by a reflection mirror so as to achieve the purpose of operation. The multi-light source structure adopts plural light sources with 30 to 50 watt, for example halogen lamps or high intensity discharge lamps generate plural light beams, and the light beams are concentrated on a projection surface through a structural adjustment, so as to achieve the purpose of operation. In the multi-light source structure, plural light sources may be installed in one lamp member or individually formed as a small lamp member, then the plural small lamp members are gathered to form a large lamp member.

With the development of high brightness LED, light emitted diodes have been used in operation lamps by some manufacturers, but the individual power of LED is merely 1.5 W to 3 W, which is much less than the power that the mentioned halogen lamp or high intensity discharge lamp can provide. As a result, LED can only be used in a multi-light source structure for providing the sufficient and required illuminant, so the LED operation lamp structure is more complicated than the mentioned single-light-source single-reflection-mirror structure and the multi-light source structure.

In fact, the light temperature of LED is very low and very suitable for the needs of operation lamp, meanwhile the LED color rendering property and color temperature is well developed and it will be the mainstream of next-generation operation lamp. However, an operation lamp has to perform focus or focusing adjustment (adjusting illumination area) within a certain distance and whenever needed, the fixed type light beam generated by a LED street lamp or a conventional lamp can not be adopted; moreover, a LED operation lamp requires multi-directional light emitting diodes to concentrate together, so a concentrated type LED large light source, e.g. a street lam, is not suitable, the reasons are the large light source is not capable of concentrating lights to form a desired light beam, so in actual use, the LED operation lamp needs plural LED small light sources which will complicate the whole structure.

Moreover, light temperature generated by LED is very low, but the heat generated by LED has to be efficiently dissipated, otherwise if the stored heat exceeds the rated LED working temperature, the LED will rapidly decay and lower the luminous flux or even burn itself, the service life thereof is therefore effected. As a result, how to effectively dissipate heat generated by larger amount of light emitting diodes is the must-solved issue for designing a LED operation lamp.

What's more, the light projected by LED is a light with high directivity. For being used in an operation lamp and providing effective light beams, two means are mostly adopted: means of concentrating light via lens or means of reflecting and concentrating light via reflection mirror, wherein means of concentrating light via lens is more direct and the structure thereof is relatively simple. But the means of concentrating light via lens is to directly project high intensity pointy light, thus medical personnel are not suggested to directly look at the lamp member with bare eyes; the means of reflecting and concentrating light via reflection mirror enables the direct light of LED to be projected on a reflection mirror, and the special design of reflection surface, e.g. little grid surface, allows the reflected light to be unified for forming as one light beam, so when a medical personnel looks directly, it is a light on a reflection surface, instead of a high intensity pointy light. As mentioned above, the means of reflecting and concentrating light via reflection mirror is better than the means of concentrating light via lens. However, issues such as how to install a large amount of reflection mirror racks, adjusting and controlling, and heat dissipation are still needed to be improved.

SUMMARY OF THE INVENTION

One primary object of the present invention is to provide an operation lamp, illumination units of the operation lamp are design to be modularized, so functions of rapidly reflecting and focusing a plurality of LED light source sets are provided; and the operation lamp is capable of focusing and adjusting illumination area within a certain distance whenever needed, so as to meet the needs of operation illumination.

For achieving the mentioned object, one solution provided by the present invention is to provide an operation lamp, comprises:

a plurality of illumination units, each illumination unit has a substrate on which a plurality of LED light source sets are installed, each LED light source set is formed with a pair of light permeable holes on the surface of the substrate, a connection bridge is installed between each pair of light permeable holes for the installation of light emitting diode; the top of each LED light source set is installed with a reflection mirror, at least two focusing devices are provided between the reflection mirror and each pair of light permeable holes, the distance between the reflection mirror and the light emitting diode is altered through adjusting each focusing device so as to adjust the oblique angle of the reflection mirror, such that each illumination unit reflects and concentrates and focuses light to form a concentrated light beam and projects to a pre-set projection point of each illumination unit;

a fastening seat, the center thereof is formed with a chamber, the periphery thereof is installed with a plurality of sliding slots arranged with equal angles, each sliding slot is served to allow a connection part extended from the inner end of illumination unit to be inserted;

a focus adjusting device, an upper portion of a rotation handle thereof is passed through the bottom of the fastening seat, and is sleeved with a screw rod, which can synchronously rotate with the rotation handle, in the chamber; the top of the rotation handle is connected with an end sealing member; an elevating ring is sleeve at the outer end of the screw rod, the elevating ring is connected to the connection part at the inner end of each illumination unit, and at least one guiding rod is installed between the elevating ring and the screw rod; through rotating the rotation handle, each guiding rod is converted to perform a linear movement with the rotation of the screw rod, such that the elevation angle of the inner end of each illumination unit is able to be adjusted so as to adjust the illumination area of concentration light beam of each illumination unit;

a lamp housing, the top center of the inner wall thereof allows the fastening seat to be connected and fastened, the bottom periphery thereof is inwardly extended with a bottom plate for connecting with the outer end of each illumination unit.

Another object of the present invention is to provide an illumination unit for operation lamp, the illumination unit is design to be modularized so as to be provided with functions of rapidly focusing and adjusting illumination area of plural LED light source sets.

For achieving the mentioned object, another solution provided by the present invention is to provide an illumination unit for operation lamp, comprising:

a substrate, on which plural LED light source sets are installed, each LED light source set is provided with a pair of light permeable holes on the surface of the substrate, a connection bridge is installed between each pair of light permeable holes for the installation of light emitting diode;

reflection mirrors, the quantity thereof is corresponding to that of the LED light source sets, each reflection mirror is installed on the top of the LED light source set, at least two focusing devices are provided between the reflection mirror and each pair of light permeable holes;

through adjusting each focusing device for altering the distance between the reflection mirror and the light emitting diode, the oblique angle of the reflection mirror is adjusted, such that the illumination unit reflects and concentrates and focuses light to form a concentrated light beam, and projects to a projection point pre-set on the illumination unit.

DETAILED DESCRIPTION OF THE PREFERRED EMBODIMENT

Figure 1:
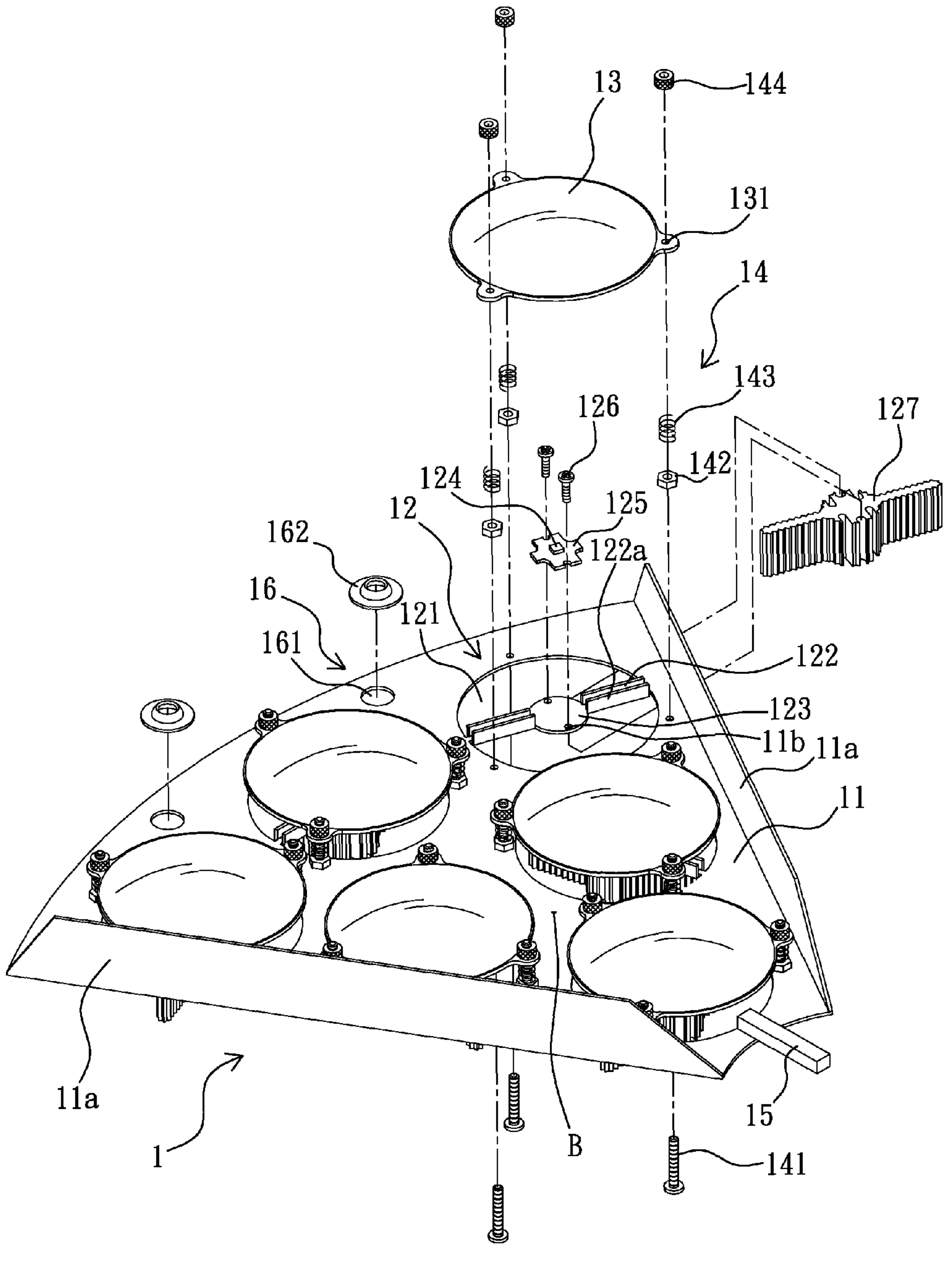
FIG. 1 is a perspective exploded view of the illumination unit of the present invention.
Figure 2:
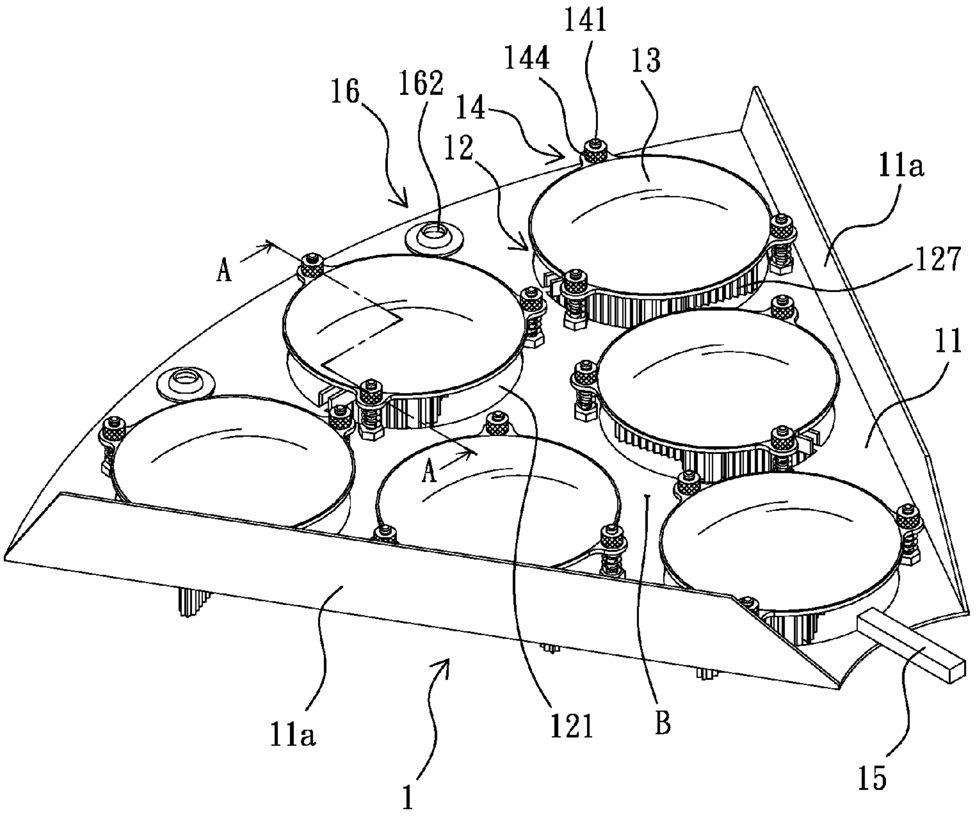
FIG. 2 is a perspective view of the assembled illumination unit of the present invention.
Figure 3:
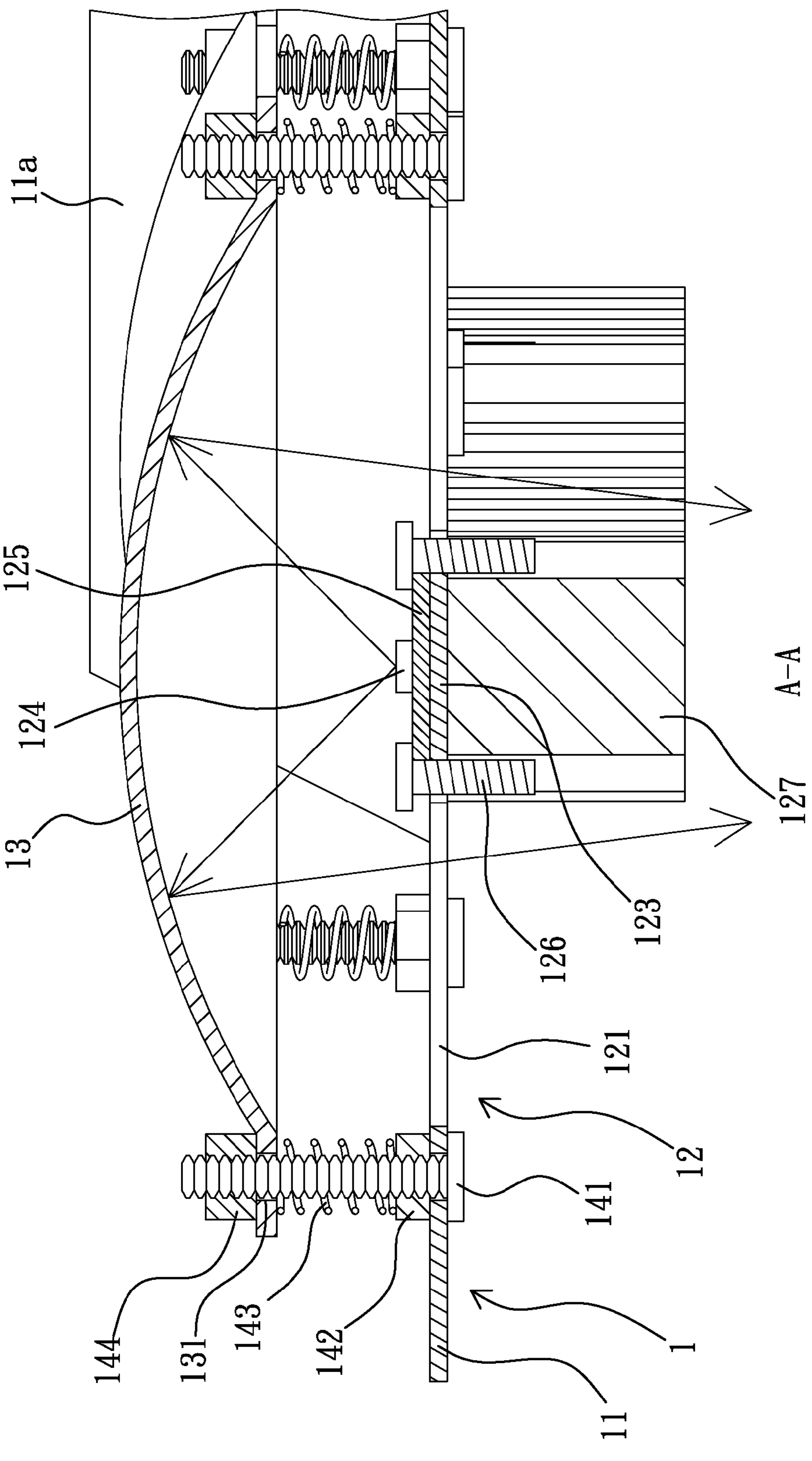
FIG. 3 is a cross sectional view of FIG. 2 intercepted along an A-A line.
Figure 4:
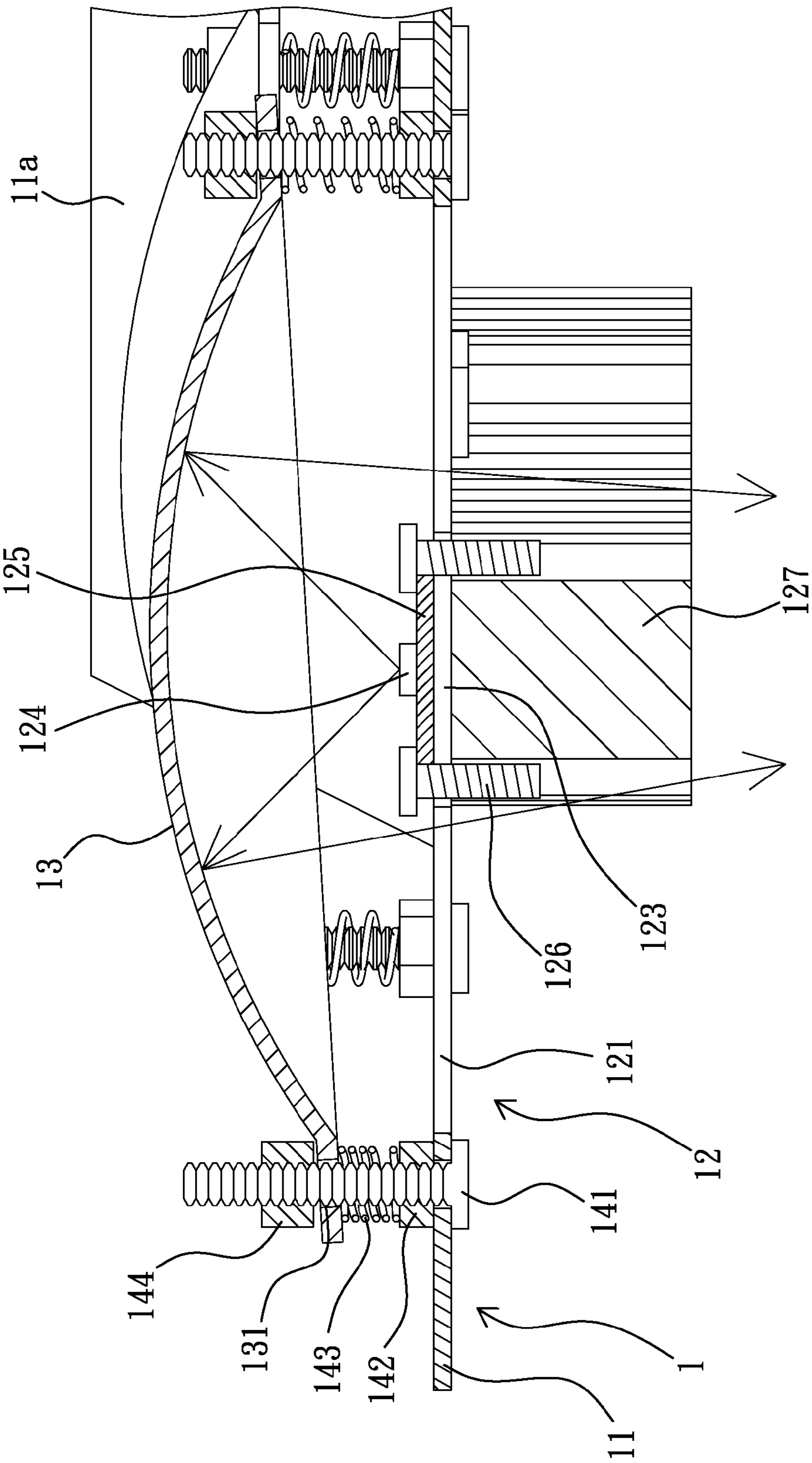
FIG. 4 is a cross sectional view illustrating the focus adjustment of illumination unit of the present invention.
Figure 5:
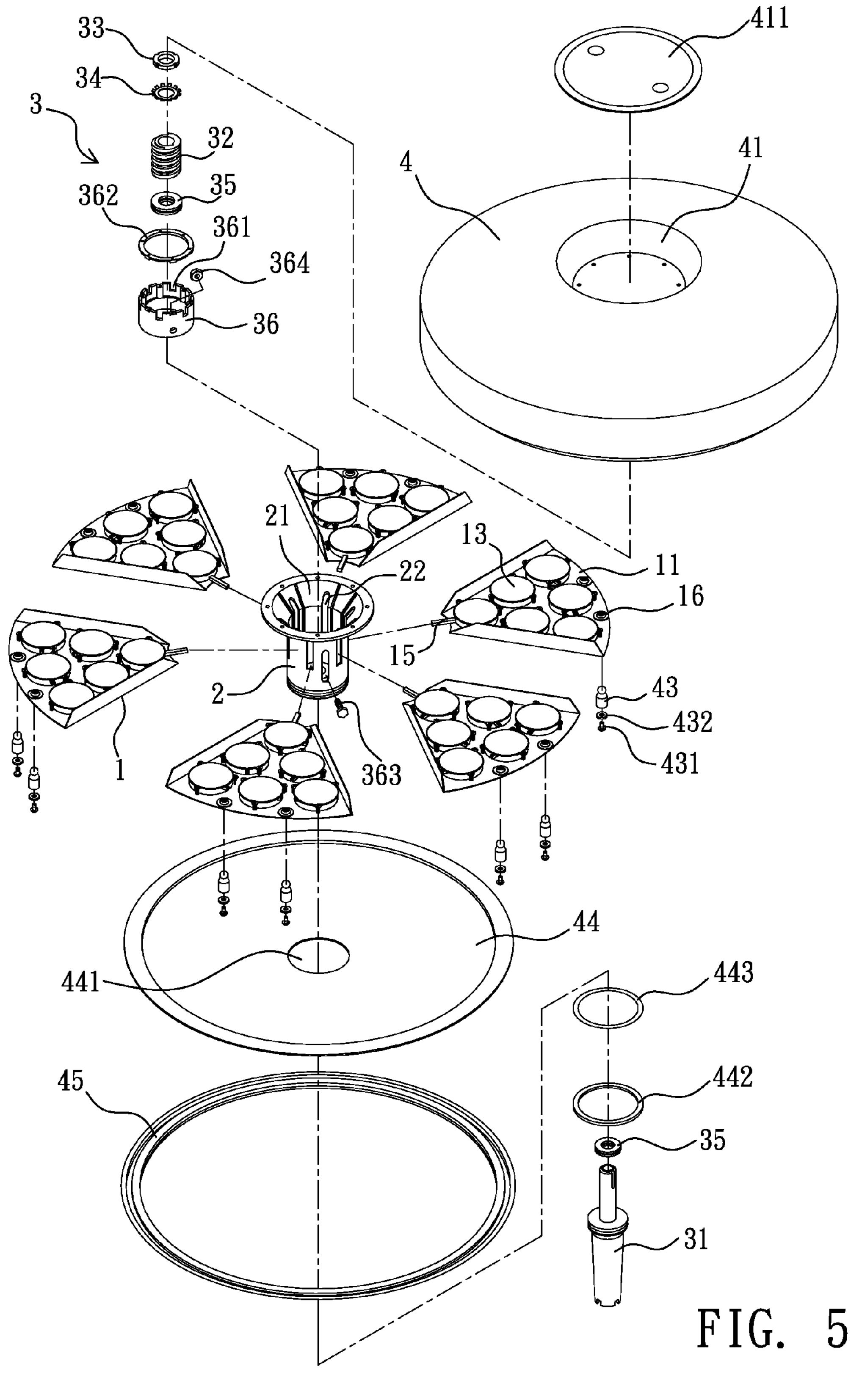
FIG. 5 is a perspective exploded view of the operation lamp of the present invention.
Figure 6:
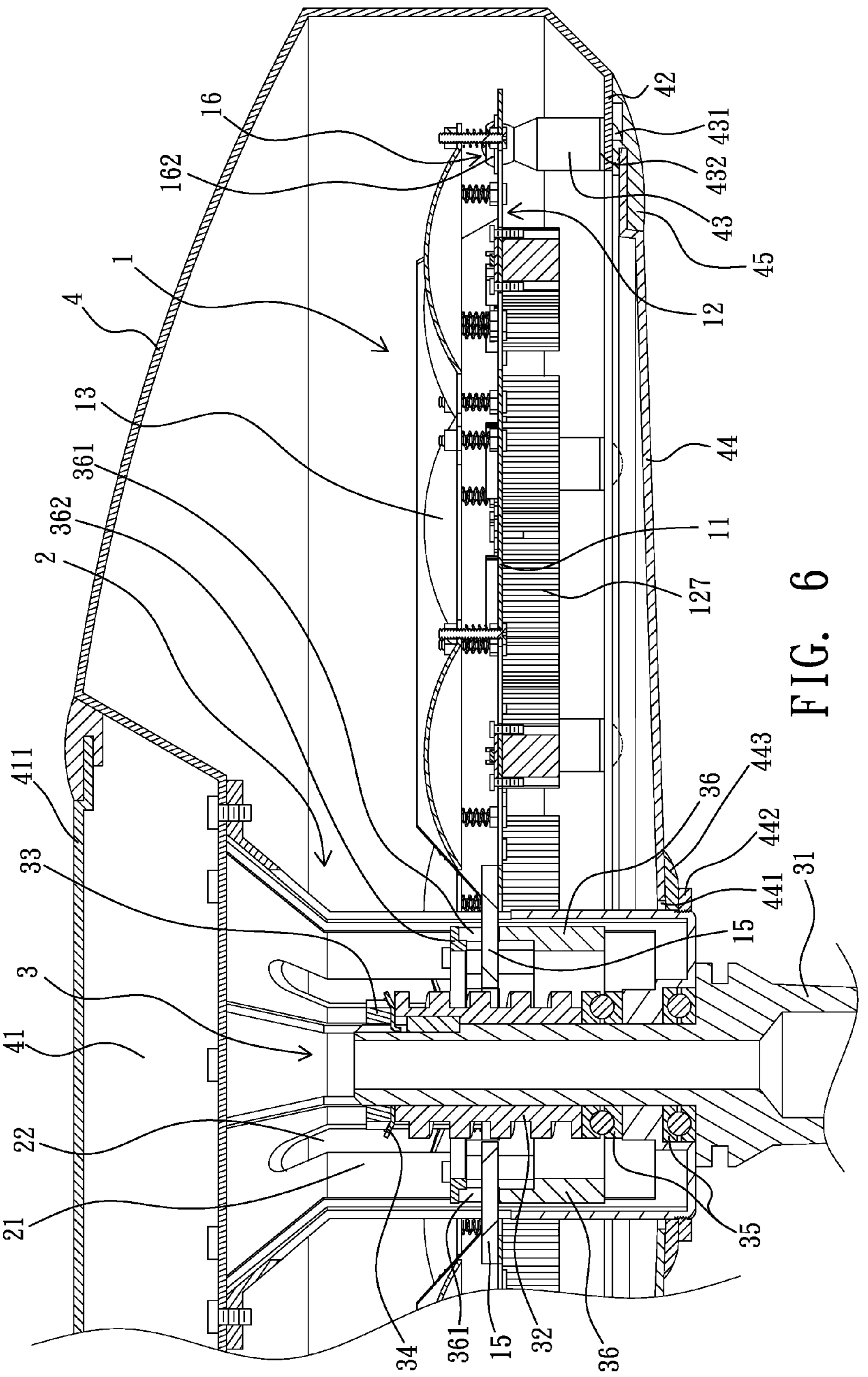
FIG. 6 is a partially-enlarged cross sectional view of the assembled operation lamp of the present invention.
Figure 7:
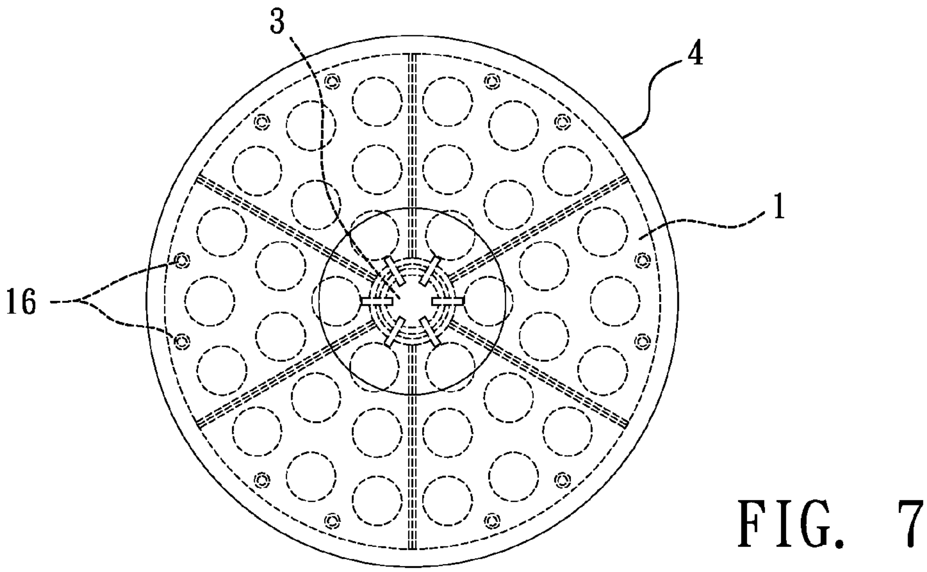
FIG. 7 is a top view of the operation lamp of the present invention.
Figure 8:
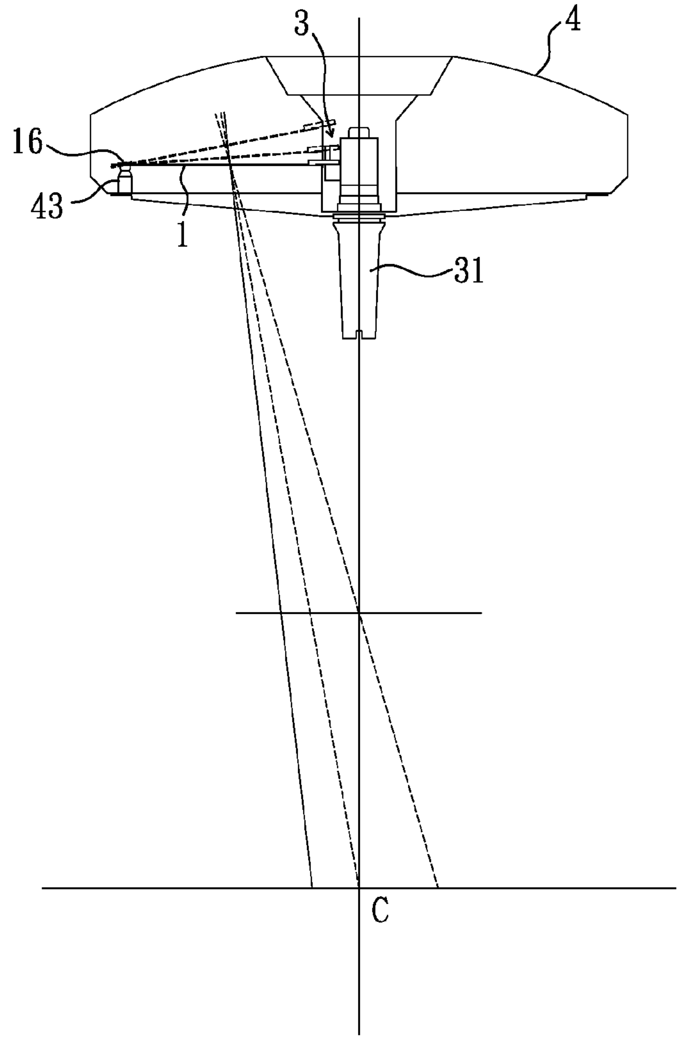
FIG. 8 is a schematic view illustrating the focus adjustment of operation lamp of the present invention.
Figure 9:
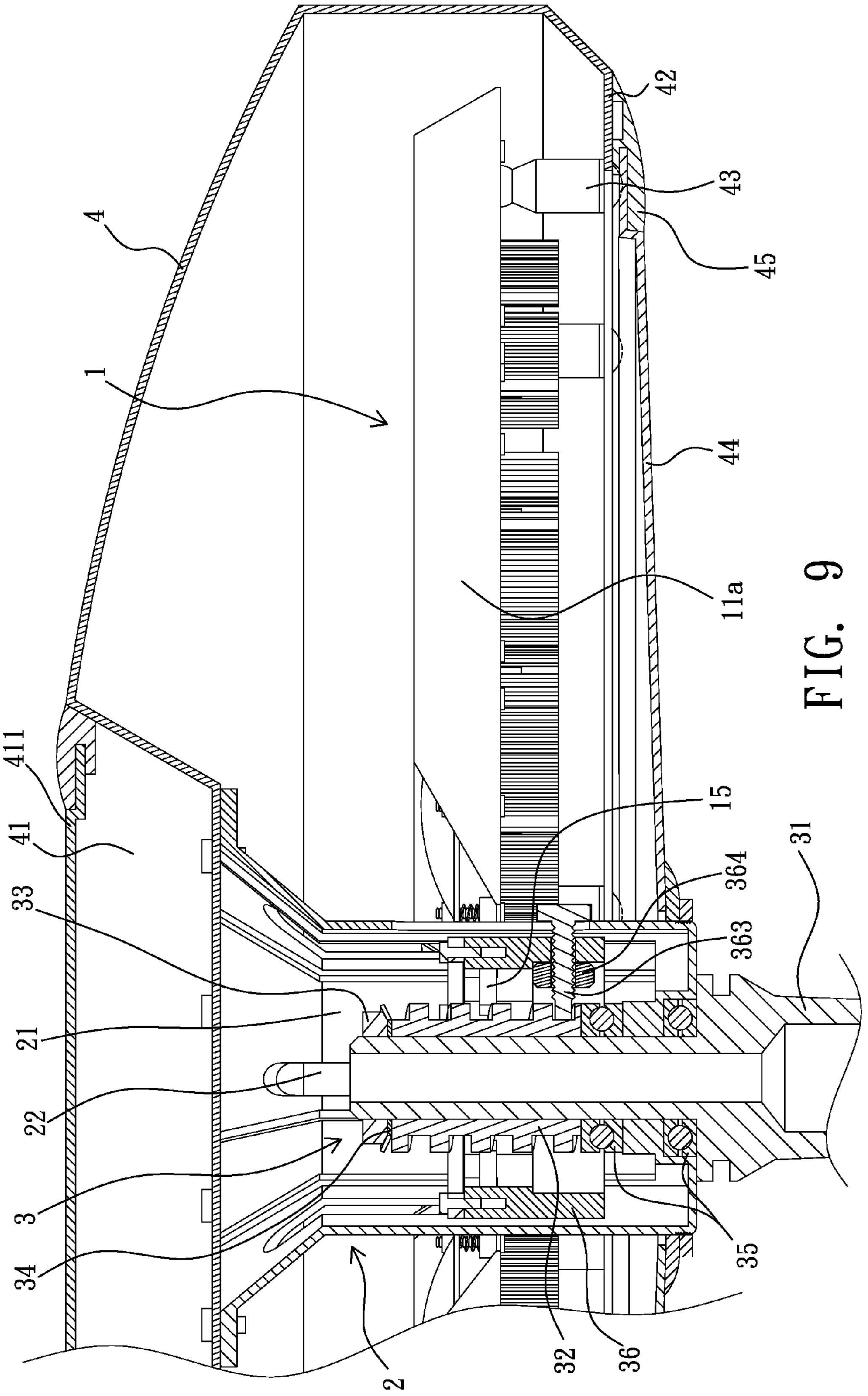
FIG. 9 is a cross sectional view of the operation lamp of the present invention before the focus adjustment.
Figure 10:
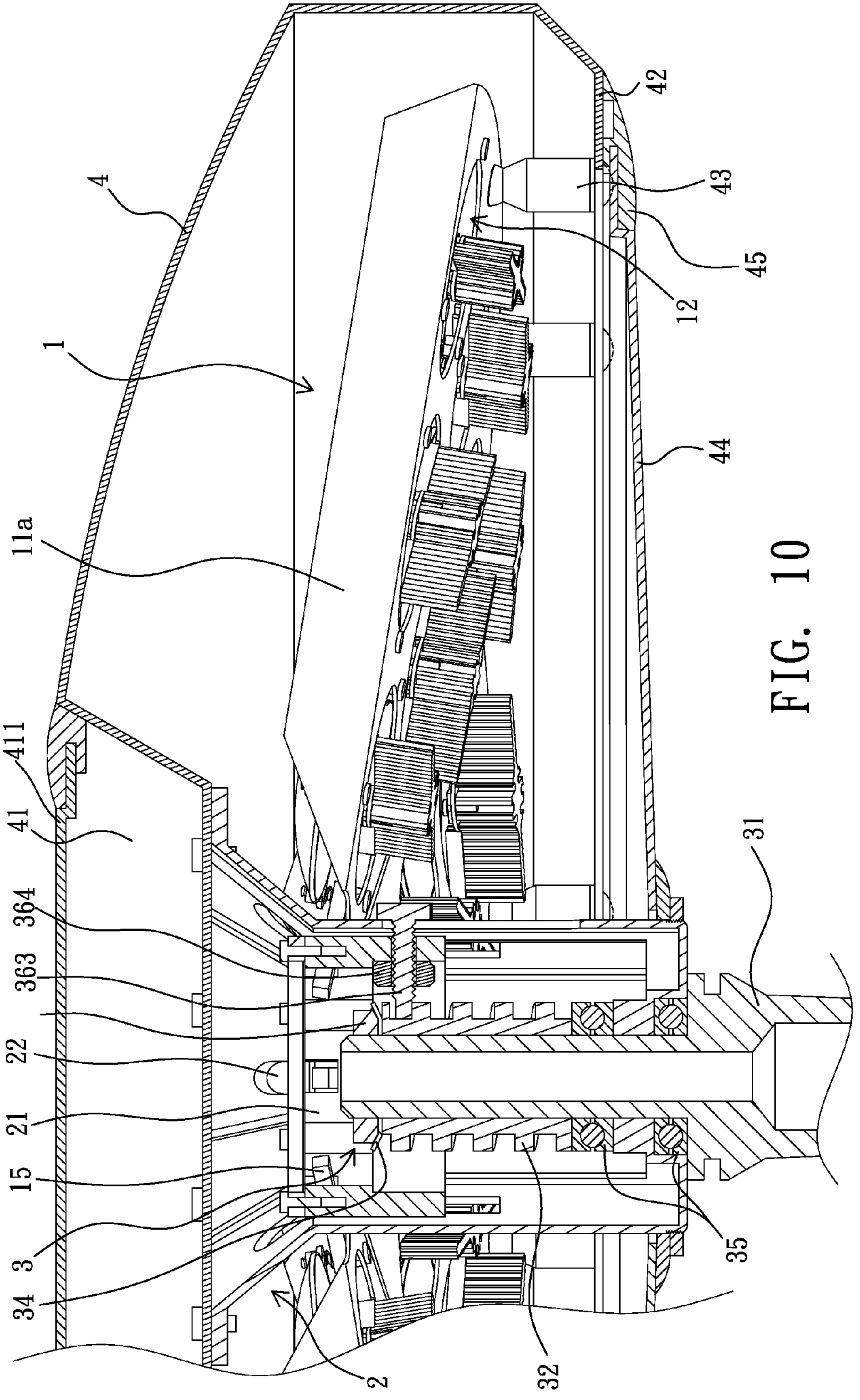
FIG. 10 is a cross sectional view of the operation lamp of the present invention after the focus adjustment.

For further disclosing the present invention, please refer to figures, wherein FIG. 1 is a perspective exploded view of the illumination unit of the present invention; FIG. 2 is a perspective view of the assembled illumination unit of the present invention; FIG. 3 is a cross sectional view of FIG. 2 intercepted along an A-A line; FIG. 4 is a cross sectional view illustrating the focus adjustment of illumination unit of the present invention; FIG. 5 is a perspective exploded view of the operation lamp of the present invention; FIG. 6 is a partially-enlarged cross sectional view of the assembled operation lamp of the present invention; FIG. 7 is a top view of the operation lamp of the present invention; FIG. 8 is a schematic view illustrating the focus adjustment of operation lamp of the present invention; FIG. 9 is a cross sectional view of the operation lamp of the present invention before the focus adjustment; and FIG. 10 is a cross sectional view of the operation lamp of the present invention after the focus adjustment.

Referring from FIG. 1 to FIG. 5, the operation lamp provided by the present invention consists of a plurality of illumination units 1, a fastening seat 2, a focus adjusting device 3, and a lamp housing 4.

Each illumination unit 1 has a substrate 11 with a geometric shape, e.g. fan-like shape. The surface of each substrate 11 is installed with a plurality of LED light source sets 12, as shown in FIG. 1; each LED light source set 12 is formed with a pair of light permeable holes 121, having symmetrical shapes e.g. semi-circular shapes, on the surface of the substrate 11. A connection bridge 122 is provided between each pair of light permeable holes 121. For accommodating and positioning a light emitting diode 124, the center of the connection bridge 122 has a circular fastening base 123, the light emitting diode 124 is adhered on a seat board 125 made of aluminum; conventional connecting members 126, e.g. screws, are provided to pass through the seat board 125 and the fastening base 123, then fixed with a heat dissipation block 127 made of aluminum and having the same cross sectional shape as the connection bridge 122 and the fastening base 123. The surface of the heat dissipation block 127 is installed with conventional heat dissipation fins for increasing the heat dissipation area. As a result, heat generated during the illumination of light emitting diode 124 is capable of passing through the seat board 125, the connection bridge 122 and the fastening base 123, and being diffused to the substrate 11 and the heat dissipation block 127, such that the light emitting diode 124 is prevented from exceeding the rated working temperature, so as to prolong the service life thereof.

For allowing reflection light beams passing through each connection bridge 122, the design for the width of the connection bridge 122 can not be overly wide or heat dissipation problems may be generated, thus two lateral sides of each connection bridge 122 are bended to form heat dissipation bended walls 122*a* upwardly and/or downwardly along a direction in which the light beams are transmitted. Moreover, two lateral sides of the fan-shaped substrate 11 can be respectively bended to form a vertical bended edge 11*a* for being provided with functions of enhancing the strength of the substrate 11 and increasing the heat dissipation area of the substrate 11, and with advantages of not occupying unnecessary space and enhancing the heat dissipation performance.

The top of each LED light source set 12 is installed with an arc-shaped reflection mirror 13. At least two focusing devices 14 are provided between the reflection mirror 13 and each pair of light permeable holes 121; fastening members 141 of each focusing device 14, e.g. screw bolts, are served to pass through positioning holes 11*b* pre-set on the periphery of each pair of light permeable holes 121 and respectively connected to connecting members 142, e.g. nuts, for fastening and connecting, so the fastening members 141 are vertically installed at the periphery of each pair of light permeable holes 121; then a resilient member 143, e.g. a spring, is respectively sleeved on the connecting member 142 of the fastening member 141. Through holes 131 installed at the periphery of the reflection mirror 13 and having a diameter larger than that of the fastening member 141 and having proper slits are installed on the fastening members 141, such that after the bottom circumference of the reflection mirror 13 is abutted against the resilient member 143, a rotation member 144, e.g. a thread rotation button, is screwed on the fastening member 141, so the reflection mirror 13 is supported by the resilient member 143. As shown in FIG. 2 and FIG. 3, which are an exploded view and a cross sectional view of the assembled illumination unit 1 before the reflection mirror 13 being processed with the focus adjustment.

Referring to FIG. 4, if individual focus between the LED light source set 12 and the corresponding reflection mirror 13 is desired to be adjusted, a user only have to rotate the rotation members 144, the distance between the reflection mirror 13 and the light emitting diode 124 is able to be adjusted correspondingly to the depths in which the fastening members 141 are screwed, such that the light beam angle of each light beam is able to be controlled; because the through holes 131 of the reflection mirror 13 are larger than the fastening members 141, at least two supporting points (the through holes 131) of the reflection mirror 13 are enabled to be locked in with different depths, so the oblique angle of the reflection mirror 13 is able to be freely adjusted. The light beams of the light emitting diode 124 are reflected by the reflection mirror 13 for being projected to projection points pre-set on each illumination unit 1, for example one meter below the B point shown in FIG. 1 and FIG. 2, such that individual light beams of the six LED light source sets 12 of the illumination unit 1 are concentrated to form a concentrated light beam.

For assembling each illumination unit 1 to form an operation lamp, a connection part 15 is extended at the inner end thereof, and the outer end thereof is installed with at least two pivot parts 16. As shown in FIG. 1 and FIG. 2, each pivot part 16 is installed with a pivot hole 161 at the outer end of the substrate 11, the top of the pivot part 16 is assembled with an arc-shaped pivot cover 162, the connection means of the connection part 15 and the pivot parts 16 will be further disclosed thereinafter.

As shown in FIG. 5 and FIG. 6, the operation lamp provided by the present invention further includes the fastening seat 2, the top thereof is connected to the lamp housing 4, the center thereof is formed with a hollow chamber 21, the periphery thereof is installed with plural sliding slots 22 arranged with equal angles. Each sliding slot 22 is capable of allowing the connection part 15 of an individual illumination unit 1 to be inserted therein, so as to be connected to an elevating ring 36 of the focus adjusting device 3.

An upper portion of a rotation handle 31 of the focus adjusting device 3 passes through the bottom of the fastening seat 2, and is sleeved with a screw rod 32 in the chamber 21, such that the screw rod 32 is able to synchronously rotate with the rotation handle 31. The top of the rotation handle 31 is connected with an end sealing member 33, e.g. a nut, wherein a washer 34 is preferably installed between the end sealing member 33 and the screw rod 32 for avoiding the separation of the end sealing member 33 and the rotation handle 31. For proving a smooth rotation to the rotation handle 31 and the screw rod 32, a thrust bearing 35 is respectively installed between the rotation handle 31 and the fastening seat 2, and between the fastening seat 2 and the screw rod 32.

The elevating ring 36 is sleeved on the screw rod 32, the top thereof is installed with a plurality of positioning slots 361 arranged with equal angles, each positioning slot 361 allows each connection part 15 of the illumination unit 1 to be installed thereon, then an end cover 362 is connected to the top of the elevating ring 36, such that each connection part 15 is prevented from axially releasing from the corresponding positioning slot 361. Meanwhile, at least one guiding rod 363 is provided and passed through the sliding slots 22 vertically installed on the fastening seat 2 and the elevating ring 36, then each guiding rod 363 is locked with a connecting member 364, e.g. a nut, so the inner end of the guiding rod 363 is inserted in a concave slot of the screw rod 32 (as shown in FIG. 9).

The top center of the lamp housing 4 has a concave part 41, the bottom thereof is connected and fastened with the fastening seat 2, wherein the concave part 41 is able to be sealed through a sealing cover 411. A bottom plate 42, inwardly extending at the bottom periphery of the lamp housing 4, is respectively and protrudingly installed with a supporting member 43 capable of fine tuning height, e.g. a ball bearing, and disposed at the locations corresponding to the pivot parts 16 at the outer end of each illumination unit 1; the top of the supporting member 43 is sleeved in the pivot hole 161 and the pivot cover 162, so the outer end of each illumination unit 1 is pivoted and supported on the corresponding supporting member 43 of the bottom plate 42, and the connection part 15 installed at the inner end is fastened on the elevating ring 36. Each supporting member 43 is fastened through a connecting member 431, e.g. a screw, on the bottom plate 42. For altering the oblique angle of the outer end of each illumination unit 1, each supporting member 43 and the bottom plate 42 can be optionally installed with at least one height-increasing pad 432.

Moreover, a bottom opening of the bottom plate 42 of the lamp housing 4 can be further installed with a transparent lampshade 44; the center of the lampshade 44 is formed with a through hole 441 for allowing the bottom of the fastening seat 2 to protrude, and is installed at the bottom of the fastening seat 2 through a connecting member 442, e.g. a nut, and a washer 443, so the rotation handle 31 protrudes out of the bottom of the lampshade 44 for allowing a user to operate. The periphery of the lampshade 44 is connected with a decorative ring 45 for embellishing the connecting positions connected to the bottom of the lamp housing 4.

Referring to FIG. 7, which is a top view of the operation lamp of the present invention. Six fan-shaped illumination units 1 are circularly installed inside the lamp housing 4, in which the inner end of each illumination unit 1 is connected to the focus adjusting device 3, the two pivot parts 16 at the outer end are supported on the supporting member 43 of the bottom plate 42 of the lamp housing 4. Take the illumination unit 1 located at the center of the left side (referring to FIG. 7) for instance, a Y axle and an X axle are longitudinally and transversally defined at the center point of the fastening seat 2.

Referring from FIG. 8 to FIG. 10, before being dispatched from factory, distance adjustment of the two pivot parts 16 at the outer end of the illumination unit 1, located at the center of the left side, is processed with the height difference of the supporting members 43, so as to adjust the left/right oblique angle of the illumination unit 1, such that the concentrated light beam can be precisely adjusted to pass through the projection point C of the lamp center (i.e. the center of the rotation handle 31) in the Y axle projection direction. And the adjusting means for the other five illumination unit 1 are the same as the means shown above. With such adjusting mechanism, the concentrated light beam of each illumination unit 1 of the operation lamp can be precisely projected to a desired location for achieving the needs of operation illumination.

When the operation lamp is installed in an operation room, medical personnel rotates the rotation handle 31, the guiding rod 363 is converted to perform a linear movement with the rotation of the screw rod 32; meanwhile the inner end of each illumination unit 1 synchronously moves upwardly or downwardly with the elevating ring 36, such that the concentrated light beam of each illumination unit 1 is able to be freely adjusted to a desired projection location along the X axle through adjusting the oblique angle of the inner end of each illumination unit 1, so as to perform a focus adjusting operation (adjusting projection area).

The design of the present invention provides following advantages: the illumination units are designed to be modularized, so a plurality of LED light source sets and reflection mirrors can be processed with a rapid focus adjustment for allowing each illumination unit reflecting and concentrating and focusing light for forming a concentrated light beam; when the plural illumination units combine with a lamp housing, the left/right oblique angle of the illumination unit can be adjusted through adjusting the height difference between at least two pivot parts at the outer end of each illumination unit and supporting members, so each concentrated light beam can be precisely adjusted to pass through the lamp center. Moreover, by adjusting the focus adjusting device, the elevation angle of the inner end of each illumination unit is adjusted, such that the concentrated light beam is able to be freely adjusted to any projection location in the horizontal direction, so as to adjust the illumination area.

Moreover, without influencing reflection light beam passing through, the heat dissipation area of the LED light source set of each illumination unit of the present invention can be increased through the heat dissipation bended walls formed by upwardly and/or downwardly bending two sides of the connection bridge; and the bottom of the connection bridge is able to be connected with a heat dissipation block having the same cross section; two sides of the substrate are bended to form vertical bended edges for increasing the strength of the substrate and also increasing the heat dissipation area of the substrate. Therefore the present invention provides a novel design compared to conventional and similar objects.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An operation lamp, comprising:

a plurality of illumination units, each illumination unit having a substrate on which a plurality of LED light source sets being installed, each LED light source set being formed with a pair of light permeable holes on the surface of the substrate, a connection bridge being installed between each pair of light permeable holes for the installation of light emitting diode; the top of each LED light source set being installed with a reflection mirror, at least two focusing devices being provided between the reflection mirror and each pair of light permeable holes, the distance between the reflection mirror and the light emitting diode being altered through adjusting each focusing device so as to adjust the oblique angle of the reflection mirror, such that each illumination unit reflecting and concentrating and focusing light to form a concentrated light beam and projecting to a pre-set projection point of each illumination unit;

a fastening seat, the center thereof being formed with a chamber, the periphery thereof being installed with a plurality of sliding slots arranged with equal angles, each sliding slot being served to allow a connection part extended from the inner end of each illumination unit to be inserted;

a focus adjusting device, an upper portion of a rotation handle thereof being passed through the bottom of the fastening seat; after being sleeved with a screw rod, capable of synchronously rotating with the rotation handle, in the chamber, the top of the rotation handle being connected with an end sealing member; an elevating ring being sleeved at the outer end of the screw rod, the elevating ring being connected to the connection part at the inner end of each illumination unit, and at least one guiding rod being installed between said elevating ring and said screw rod; through rotating said rotation handle, each guiding rod being converted to perform a linear movement with the rotation of said screw rod, such that the elevation angle of said inner end of each illumination unit being adjusted so as to adjust the illumination area of concentration light beam of each illumination unit; and a lamp housing, the top center of the inner wall thereof allowing the fastening seat to be connected and fastened, the bottom periphery thereof being inwardly extended with a bottom plate for connecting with the outer end of each illumination unit.

2. The operation lamp as claimed in claim 1, wherein a fastening base is further installed at the center of said connection bridge, and a metal seat board installed at the bottom of said light emitting diode is fastened on the top surface of said fastening base.

3. The operation lamp as claimed in claim 2, wherein said connection bridge and the bottom surface of said fastening base are installed with a metal heat dissipation block having the same cross section as said connection bridge and said fastening base.

4. The operation lamp as claimed in claim 1, wherein two sides of said connection bridge are upwardly and/or downwardly bended to form heat dissipation bended walls, and two lateral sides of said substrate are respectively bended to form a vertical bended edge.

5. The operation lamp as claimed in claim 1, wherein said focusing device has a fastening member fastened and protruded at a positioning hole pre-set at the periphery of each pair of light permeable holes; after a resilient member is sleeved on said fastening member, through holes installed at the periphery of said reflection mirror and having an inner diameter larger than said fastening member is sleeved on said fastening member, so the bottom periphery of said reflection mirror is abutted against said resilient member, and a rotation member is connected with said fastening member, such that said reflection mirror is supported by said resilient member; through rotating said rotation member, the distance between said reflection mirror and said light emitting diode is altered so as to adjust the oblique angle of said reflection mirror.

6. The operation lamp as claimed in claim 1, wherein a washer is further installed between said screw rod and said end sealing member, and a thrust bearing is respectively installed between said rotation handle and said fastening seat, and between said fastening seat and said screw rod.

7. The operation lamp as claimed in claim 1, wherein the top of said elevating ring is installed with a plurality of positioning slots arranged with equal angles, each positioning slot allows said connection part of said illumination unit to be installed thereon, then an end cover is connected to the top of said elevating ring.

8. The operation lamp as claimed in claim 1, wherein said outer end of each illumination unit is further installed with at least two pivot parts, and said bottom plate of said lamp housing is provided with supporting members, capable of being fine tuned, corresponding to the location where each pivot part is disposed, and each supporting member is sleeved in said pivot part; through adjusting the height difference between said pivot parts and said supporting members, the left/right oblique angle of each illumination unit is able to be altered, such that the concentrated light beam of each illumination unit is able to precisely pass through the center of said rotation handle.

9. The operation lamp as claimed in claim 8, wherein each pivot part is installed with a pivot hole at the outer end of said substrate of each illumination unit, and the top thereof is connected with an arc-shaped pivot cover; said supporting member is a ball bearing, the top thereof is installed in said pivot hole and said pivot cover; wherein each supporting member utilizes a connecting member passing through said bottom plate for being fastened, and at least one height-increasing pad is optionally installed between each supporting member and said bottom plate.

10. The operation lamp as claimed in claim 1, wherein a bottom opening of said bottom plate of said lamp housing is further installed with a transparent lampshade, a through hole is formed at the center of said lampshade for allowing said fastening seat to protrude, and a connecting member is connected to the bottom of said fastening seat.

11. An illumination unit for operation lamp, comprising:

a substrate, on which plural LED light source sets being installed, each LED light source set being provided with a pair of light permeable holes on the surface of said substrate, a connection bridge being installed between each pair of light permeable holes for the installation of light emitting diode;

reflection mirrors, the quantity thereof being corresponding to that of said LED light source sets, each reflection mirror being installed on the top of said LED light source set, at least two focusing devices being provided between said reflection mirror and each pair of light permeable holes;

through adjusting each focusing device for altering the distance between said reflection mirror and said light emitting diode, the oblique angle of said reflection mirror being adjusted, such that said illumination unit reflecting and concentrating and focusing light to form a concentrated light beam, and projecting to a projection point pre-set on said illumination unit.

12. The illumination unit for operation lamp as claimed in claim 11, wherein a fastening base is further installed at the center of said connection bridge, and a metal seat board installed at the bottom of said light emitting diode is fastened on the top surface of said fastening base.

13. The illumination unit for operation lamp as claimed in claim 12, wherein said connection bridge and the bottom surface of said fastening base are installed with a metal heat dissipation block having the same cross section as said connection bridge and said fastening base.

14. The illumination unit for operation lamp as claimed in claim 11, wherein two sides of said connection bridge are upwardly and/or downwardly bended to form heat dissipation bended walls, and two lateral sides of said substrate are respectively bended to form a vertical bended edge.

15. The illumination unit for operation lamp as claimed in claim 11, wherein said focusing device has a fastening member fastened and protruded at positioning holes pre-set at the periphery of each pair of light permeable holes; after a resilient member is sleeved on said fastening member, through holes installed at the periphery of said reflection mirror and having an inner diameter larger than said fastening member is sleeved on said fastening member, so the bottom periphery of said reflection mirror is abutted against said resilient member, and a rotation member is connected with said fastening member, such that said reflection mirror is supported by said resilient member; through rotating said rotation member, the distance between said reflection mirror and said light emitting diode is altered so as to adjust the oblique angle of said reflection mirror.

16. The illumination unit for operation lamp as claimed in claim 11, wherein the inner end of said illumination unit is installed with a rod-shaped connection part, and the outer end thereof is provided with at least two pivot parts, each pivot part is installed with a pivot hole at the outer end of said substrate, and the top thereof is connected with an arc-shaped pivot cover.

* * * * *